(12) United States Patent
Pryor

(10) Patent No.: US 7,068,996 B1
(45) Date of Patent: Jun. 27, 2006

(54) BANDED BILLING SYSTEM FOR TELECOMMUNICATION SERVICE

(75) Inventor: Bruce A. Pryor, Shawnee Mission, KS (US)

(73) Assignee: Sprint Spectrum L.P., Overland Park, KS (US)

(*) Notice: Subject to any disclaimer, the term of this patent is extended or adjusted under 35 U.S.C. 154(b) by 226 days.

(21) Appl. No.: 10/824,163

(22) Filed: Apr. 14, 2004

(51) Int. Cl.
*H04M 11/00* (2006.01)

(52) U.S. Cl. ............ 455/406; 379/114.01; 379/114.02; 379/114.03; 379/114.04; 379/114.05; 379/114.06; 379/114.07; 379/114.08; 379/114.09; 379/121.02; 379/121.03; 379/121.04; 379/121.05; 379/121.06

(58) Field of Classification Search ............... 455/406, 455/412.1, 414.1–4; 379/114.01–114.09, 379/121.02–121.06
See application file for complete search history.

(56) References Cited

U.S. PATENT DOCUMENTS

| | | | |
|---|---|---|---|
| 4,538,030 A | 8/1985 | Fossett et al. | |
| 5,749,052 A * | 5/1998 | Hidem et al. | 455/406 |
| 6,052,447 A | 4/2000 | Golden et al. | |
| 6,182,054 B1 | 1/2001 | Dickinson et al. | |
| 6,301,471 B1 * | 10/2001 | Dahm et al. | 455/405 |
| 6,327,466 B1 * | 12/2001 | Savolainen | 455/407 |
| 6,353,736 B1 * | 3/2002 | Hiromichi | 455/406 |
| 6,512,751 B1 | 1/2003 | Struhsaker et al. | |
| 6,556,917 B1 | 4/2003 | Wawra et al. | |
| 6,574,465 B1 * | 6/2003 | Marsh et al. | 455/406 |
| 6,597,903 B1 | 7/2003 | Dahm et al. | |
| 6,606,377 B1 | 8/2003 | Ruckart et al. | |
| 6,615,034 B1 | 9/2003 | Alloune et al. | |
| 6,947,723 B1 * | 9/2005 | Gurnani et al. | 455/406 |
| 2002/0194077 A1 | 12/2002 | Dutta | |
| 2003/0050044 A1 * | 3/2003 | Awada et al. | 455/407 |
| 2003/0232614 A1 | 12/2003 | Squibbs | |
| 2004/0009761 A1 | 1/2004 | Money et al. | |
| 2004/0043754 A1 | 3/2004 | Whewell | |
| 2004/0235451 A1 | 11/2004 | Whewell et al. | |
| 2005/0033691 A1 | 2/2005 | Whewell et al. | |
| 2005/0037731 A1 | 2/2005 | Whewell et al. | |
| 2005/0044018 A1 | 2/2005 | Whewell | |

OTHER PUBLICATIONS eBucks, Press Clipping, "Sliding scale fee structure gives way to 'simple banded' fees," http://www.itweb.co.za/office/ebucks/clipping10.htm, printed from the World Wide Web on Jan. 21, 2004.

(Continued)

*Primary Examiner*—Nick Corsaro
*Assistant Examiner*—Diego Herrera

(57) ABSTRACT

A banded billing system for telecommunication service is disclosed. A carrier's billing system maintains in data storage a banded-pricing schedule that divides a continuum of minutes of use into a series of contiguous, mutually-exclusive minute-ranges and that specifies for each minutes-range a respective cost. At the end of a billing period, the billing system determines a number of minutes of telecommunication service used by a given subscriber during the billing period. The billing system then queries the banded-pricing schedule to determine which minute-range the number of minutes falls into, and to determine the cost specified by the banded-pricing schedule for that minute-range. The billing system then bills the determined cost to the subscriber, for use of the telecommunication service in the billing period.

18 Claims, 4 Drawing Sheets

OTHER PUBLICATIONS

Nextel, Rate Plans, http://nextelonline.nextel.com/NASApp/onlinestore/Action/EnterZipCode, printed from the World Wide Web on Apr. 12, 2004.

Nextel, Flex Plans, http://nextelonline.nextel.com/phones_plans/flexplans_value_popup.html, printed from the World Wide Web on Apr. 12, 2004.

Nextel, Price Plan Details, http://nextelonline.nextel.com/NASApp/onlinestore/Action/RatePlanDetails?PLAN_ID=ARR12501&zipCode=43085, printed from the World Wide Web on Apr. 12, 2004.

Call Center Plus, "Pricing," http://callcenterplus.com/pricing.html, printed from the World Wide Web on Jan. 21, 2004.

* cited by examiner

| Banded-Pricing Schedule A ||  |
|---|---|---|
| Low | High | Monthly Cost |
| 0 | 300 | $35.00 |
| 301 | 325 | $37.50 |
| 326 | 350 | $40.00 |
| 351 | 375 | $42.50 |
| 376 | 400 | $45.00 |
| 401 | 425 | $47.50 |
| 426 | 450 | $50.00 |
| 451 | 475 | $52.50 |
| 476 | 500 | $55.00 |
| 501 | 525 | $57.50 |
| 526 | 550 | $60.00 |
| 551 | 575 | $62.50 |
| 576 | 600 | $65.00 |
| 601 | 625 | $67.50 |
| 626 | 650 | $70.00 |
| 651 | 700 | $72.50 |
| 701 | 750 | $75.00 |
| 751 | 800 | $77.50 |
| 801 | 850 | $80.00 |
| 851 | 900 | $82.50 |
| 901 | 950 | $85.00 |
| 951 | 1,000 | $87.50 |
| 1,001 | 1,050 | $90.00 |
| 1,051 | 1,100 | $92.50 |
| 1,101 | 1,150 | $95.00 |
| 1,151 | 1,200 | $97.50 |
| 1,201 | 1,250 | $100.00 |
| Additional Minutes: $0.07 per minute |||

Fig. 2

| Banded-Pricing Schedule B |||
|---|---|---|
| Low | High | Monthly Cost |
| 0 | 300 | $35.00 |
| 301 | 325 | $38.00 |
| 326 | 350 | $41.00 |
| 351 | 375 | $44.00 |
| 376 | 400 | $47.00 |
| 401 | 425 | $50.00 |
| 426 | 450 | $53.00 |
| 451 | 475 | $56.00 |
| 476 | 500 | $59.00 |
| 501 | 525 | $62.00 |
| 526 | 550 | $65.00 |
| 551 | 575 | $68.00 |
| 576 | 600 | $71.00 |
| 601 | 625 | $74.00 |
| 626 | 650 | $77.00 |
| 651 | 675 | $78.50 |
| 676 | 700 | $80.00 |
| 701 | 725 | $81.50 |
| 726 | 750 | $83.00 |
| 751 | 775 | $84.50 |
| 776 | 800 | $86.00 |
| 801 | 825 | $87.50 |
| 826 | 850 | $89.00 |
| 851 | 875 | $90.50 |
| 876 | 900 | $92.00 |
| 901 | 925 | $93.50 |
| 926 | 950 | $95.00 |
| Additional Minutes: $0.07 per minute |||

Fig. 3

BANDED BILLING SYSTEM FOR TELECOMMUNICATION SERVICE

BACKGROUND

1. Field of the Invention

The present invention relates to telecommunication service and, more particularly, to billing of subscribers for such service.

2. Description of Related Art

In the existing art, when a user signs up for telephone service, the service provider will usually provide the user with a palette of service plans from which to chose. By way of example, a typical service plan will give the user a certain base number of minutes of service for a monthly fee and may then require the user to pay a fairly substantial per-minute charge for each minute of use beyond the base.

The various service plans offered by the service provider may provide assorted combinations of base-minutes/charges and per-minute charges. For instance, (i) one plan might give a user 500 minutes a month for $40.00, with a $0.30/minute charge for each excess minute, (ii) another plan might give a user 1,000 minutes a month for $50.00, with a $0.25/minute charge for each excess minute, and (iii) another plan might give a user 1,500 minutes a month for $60.00, with a $0.20/minute charge for each excess minute. Further, service providers often require users to enter into a contract for a minimum period, such as one or two years, when signing up for a new service plan.

These sorts of service plans tend to work well for users who can manage their minutes well. That is, a user who can accurately predict the number of minutes that he or she will use per month can sensibly select a service plan that provides that number of minutes per month, for a known monthly charge.

Unfortunately, however, the same cannot be said for users who do not manage their minutes well. If a user cannot accurately predict the number of minutes that he or she will use per month, the user is likely to either under-subscribe or over-subscribe, and to thereby incur additional expense that is out of proportion with the user's actual use. For instance, to avoid going over the base amount of minutes allotted per month, a user might sign up for a plan that provides many more minutes per month than the user is ever likely to use. However, such a plan would likely cost a user more than the user thinks, since the user would be paying for so many unused minutes per month. On the other hand, to avoid paying for unused minutes in this way, the user might instead sign up for a plan that includes fewer minutes than the user is likely to use per month. The end result of this alternative approach, however, would be that the user would pay more per month in substantial per-minute charges for use of excess minutes.

SUMMARY

The present invention provides an improved method and system for billing subscribers for telecommunication service. According to the invention, a service provider will maintain a banded pricing schedule that designates monthly charges corresponding with varying ranges (or "bands") of use per month. Each month, the service provider will then determine how many minutes a subscriber actually used and will refer to the banded pricing schedule to determine which range that number of minutes falls into and to identify a monthly charge for that range. The service provider will then apply that charge to the subscriber's account.

Advantageously, this banded billing arrangement thus functions as a type of insurance policy for subscribers, to safeguard against over-subscriptions and under-subscriptions. More particularly, the arrangement allows a subscriber's monthly charge to fluctuate from month to month in a manner that corresponds with the number of minutes the subscriber actually uses per month. If a subscriber uses many minutes in a given month, then the service provider will match the usage to a higher minute-range of the banded pricing schedule, and so the service provider will charge the subscriber a higher monthly fee for that month. Yet, if the subscriber uses fewer minutes in a given month, then the service provider will match the usage to a lower minute-range from the banded pricing schedule, and so the service provider will charge the subscriber a lower monthly fee for that month.

Consequently, the invention reduces or eliminates the need for a subscriber to guess how many minutes he or she will use per month when signing up for a monthly service plan. Rather, the subscriber can simply sign up for the banded pricing plan and then be billed per month based on the minute-range in which the subscriber's actual usage falls in the month.

These as well as other aspects and advantages will become apparent to those of ordinary skill in the art by reading the following detailed description, with reference where appropriate to the accompanying drawings.

BRIEF DESCRIPTION OF THE DRAWINGS

FIGS. 2 and 3 are sample banded-pricing schedules.

DETAILED DESCRIPTION OF AN EXEMPLARY EMBODIMENT

Figure 1:
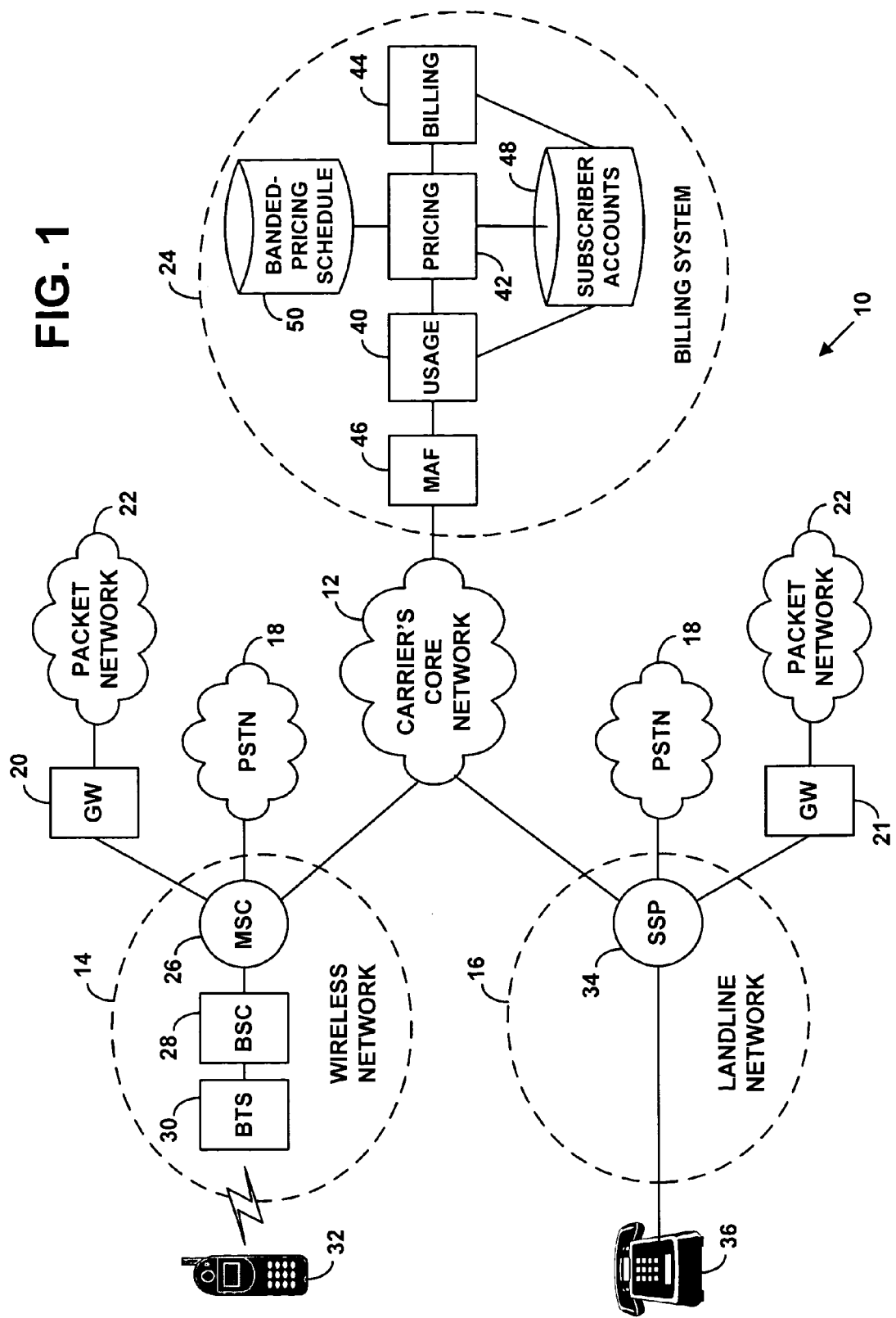
FIG. 1 is a block diagram of a telecommunication network in which an embodiment of the invention can be carried out.

The present invention can be carried out by a telecommunication service provider (carrier) or other entity, in order to charge subscribers for use of telecommunication service in a given period of time, such as monthly, bimonthly or quarterly, for instance. FIG. 1 depicts an example telecommunication network 10 that could be owned and operated by a service provider in order to provide telecommunication service and to carry out the banded billing functions of the invention.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Example network 10 of FIG. 1 includes a carrier's core network 12, such as an ATM and/or IP-based network. Connected with the core network 12 is then one or more access networks/systems, such as a wireless access network 14 and a landline access network 16, each of which may allow subscribers to engage in telecommunication services such as voice telephony and data communications. Each of the access networks is coupled, in turn, with one or more transport networks, such as the public switched telephone network (PSTN) 18 and (through a packet gateway 20, 21) a packet-switched network 22 (such as the Internet, or the carrier's core network 12). Further, also connected with the core network 12 is a billing system 24, which preferably carries out the banded billing functions, as will be described in detail below.

Each of the access networks shown by way of example in FIG. 1 includes a switch (or other analogous entity) that functions to connect calls or other communications between subscriber stations and transport networks. For instance, the wireless access network 14 includes a mobile switching center (MSC) 26 (e.g., a Nortel DMS-MSC), which, together with a base station controller (BSC) 28 and base transceiver station (BTS) 30, provides connectivity between one or more wireless subscriber stations (e.g., wireless communication device (WCD) 32) and one or more transport networks. And the landline access network 16 includes a service switching point (SSP) 34 (e.g., a Nortel DMS-100), which provides connectivity between one or more landline subscriber stations (e.g., landline telephone device 36) and one or more transport networks.

Wireless access network 14 may, more specifically, take the form of a cellular radio access network. Typically in such a network, one or more BTSs 30 would radiate to define one or more wireless coverage areas, such as cells and cell sectors, in which WCDs can operate. One or more BSCs 32 would then control air interface communications between the BTSs and the WCDs, such as to assign air interface traffic channels and facilitate handoff of communications between wireless coverage areas. In turn, one or more MSCs would control one or more BSCs and provide connectivity with one or more transport networks. Such a network could employ various types of air interface protocols, such as AMPS, TDMA, CDMA, GSM, 802.11, or other protocols now known or later developed.

Although FIG. 1 depicts in wireless access network a single MSC, a single BSC and a single BTS, it should be understood that more than one of each might exist. Further, in some implementations, these components could be integrated together in various combinations. For instance, often the functions of the BSC and MSC are integrated into a single platform, which may or may not be co-located or integrated with a BTS. Still further, note that wireless access network 14 could take various other forms as well.

Landline access network 16, on the other hand, may take the form of a conventional telephone network. Such a network may include one or more local exchange carrier (LEC) switches. In a usual arrangement, a given LEC switch will reside at a LEC's central office (or at an equivalent location, such as a cable service provider's point of presence) and will serve a particular region of landline telephone subscribers, each coupled to the LEC switch by a local loop telephone line (e.g., twisted pair, fiber, coaxial cable, through one or more intermediate entities, such as digital concentrators, cable head-ends, etc.). SSP 34 shown in FIG. 1 could be a LEC switch or some other sort of switch or other entity that provides connectivity for landline subscriber stations. Further, landline access network 16 could take other forms as well.

In practice, a switch such as MSC 26 or SSP 34 may receive requests to set up call to or from various subscriber stations and may responsively set up those calls, or cause the calls to be set up. For example, in the wireless access network 14, MSC 26 may receive an origination message transmitted from WCD 32 (via BTS 30 and BTS 28), seeking to initiate a call to a particular telephone number. In response, if the MSC 26 does not itself serve the called number, MSC 26 may engage in call setup signaling (such as ISUP signaling) through a signaling network (e.g., the carrier's core network 12, or another network) in an effort to set up the call. Alternatively, if the MSC 26 itself serves the number, then the MSC 26 may direct BSC 28 to ring the called device, and BSC 28 may do so. Once a communication path is ready between the MSC 26 and the called party, the MSC 26 may then connect the call through to the called party, and allow the call to proceed.

As another example, MSC 26 may receive a request from WCD 32 to establish data connectivity such as a wireless web session. In response, MSC 26 may engage in signaling with gateway 20, 21 to establish a packet network connectivity for the WCD 32 and may allow the WCD 32 to commence data communications.

As still another example, MSC 26 may receive a request from a signaling network seeking to set up a call to WCD 32. In response, MSC 26 may direct BSC 28 to ring WCD 32. BSC 28 may then send a page and alert message (via BTS 30) over an air interface control channel to WCD 32. When WCD 32 answers the call, MSC 26 may then allow the call to proceed.

Similarly, in the landline access network 16, SSP 34 may receive a request from landline telephone device 36 to initiate a call to a particular number. For instance, landline telephone device 36 may apply dialed digits to the local loop telephone line, which SSP 34 may receive directly or through one or more other entities. In response, if the SSP 34 does not serve the called number, SSP 34 may engage in call setup signaling (such as ISUP signaling) through a signaling network (e.g., the carrier's core network 12, or another network) in an effort to set up the call. Alternatively, if SSP 34 serves the called number, SSP 34 may itself ring that called line. Once a communication path is ready between the SSP 34 and the called party, the SSP 34 may then connect the call through to the called party, and allow the call to proceed.

And yet as another example, SSP 34 may receive a request from a signaling network seeking to set up a call to landline telephone device 36. In response, SSP 34 or another entity may apply a ring signal on the local loop telephone line to device 36, to cause device 36 to ring. When device 36 answers the call, SSP 34 may then allow the call to proceed.

Although not shown in FIG. 1, note that other switches may be present in the telecommunication network 10 as well. For instance, an inter-exchange carrier (IXC) may provide a switch (e.g., Nortel DMS-250) that serves a connection between LEC switches, MSCs or other regional telecommunication systems, so as to facilitate long distance calling. As another example, private switches (e.g., PBX servers) might be provided to serve enterprises or other groups of subscribers (e.g., hotels, campuses, etc.) Other examples are possible as well.

Conventionally, a switch (such as an MSC, an LEC switch, an IXC switch, or a PBX server, for instance) will also track subscriber usage, to facilitate billing and performance monitoring. To do so, for each call that the switch handles, the switch will generate a Call Detail Record (CDR). The CDR may take various forms but often includes certain minimum information about the call, such as the originating number, terminating number, start time, stop time, call duration, and call type (e.g., landline, wireless—wireless, long distance, voice, data (e.g., if routed to gateway 20, 21), etc.) Each CDR is typically formatted as a database record with predefined fields.

To ensure billing of the correct party (or parties) for a given call, certain switches may also be programmed to query a Numbering Management System (NMS) (not shown) so as to determine whether the originating number, terminating number or both are subscribers of the carrier's system, and the switch may flag the subscriber number(s) in the CDR. (Note that in a wireless roaming scenario, where a mobile station subscribes to a given carrier's service but operates in another carrier's system, the serving carrier may treat the roaming station as a roaming subscriber, for purposes of generating CDRs, and for later collection of payment from the mobile station's true carrier. In that situation, the serving carrier may deliver CDRs or associated usage data to the subscriber's carrier, to facilitate billing.)

A switch may be programmed to record call duration in each CDR with a desired level of accuracy. For instance, a switch could be programmed to record call duration in minutes and seconds (and even fractions of seconds). And as another example, a switch could be programmed to round call duration to the nearest whole minute and to record that whole minute count in the CDR. Further, a switch may be programmed to record a special call duration for particular calls. For instance, a switch could be programmed to record a duration of zero for calls placed between two of the carrier's subscribers (e.g., mobile-to-mobile calls), for calls placed to the carrier's customer service center or to other special destinations, or for calls that experienced system disconnects. Other examples are possible as well.

Periodically, or in response to a triggering event (such as generation of each CDR, or receipt of a request from the billing system 24), a switch may programmatically send to the billing system 24 the CDRs that it has generated. Based on the CDRs, subscriber service plans, and perhaps other data, the billing system 24 will then compute and apply charges to subscriber accounts. On a recurring basis, such as every month, every other month, or quarterly, for instance, the billing system may then generate subscriber invoices and send the invoices to subscribers for payment.

Billing system 24 can take various forms. In a preferred embodiment, for instance, the billing system 24 may comprise a number of subsystems, each of which could take the form of one or more programmed computers (e.g., computers with microprocessors and data storage (e.g., one or more volatile or non-volatile storage media, in one or more computers or other devices), and with machine language instructions (program logic) stored in the data storage and executable by the microprocessors), and all of which could reside on a local area network or could be connected together in some other way. As shown by way of example in FIG. 1, the subsystems may include a usage subsystem 40, a pricing subsystem 42, and a billing subsystem 44. Further, the billing system 24 may include a Message Acquisition and Formatter (MAF) 46 (e.g., a computer server) to buffer CDRs entering the billing system, and a subscriber account store 48 to hold subscriber accounts, such as records of usage and service plan and payment information.

As CDRs arrive at the billing system 24 from one or more switches or other entities, the MAF queues the CDRs and sends them downstream to the usage subsystem 40. Upon receipt of each CDR, the usage subsystem 40 reformats the CDR into a format used by the billing system (e.g., omitting unnecessary information) if necessary and calculates minutes of use for the call. The usage subsystem then records those minutes of use into the appropriate subscriber account record in account store 48.

Given a CDR, the usage subsystem 40 could be arranged to calculate minutes of use (MOU) in various ways, possibly depending on the type of information provided in the CDR and upon one or more other factors. For instance, if the CDR includes an indication of call duration, the usage subsystem 40 might use the indicated call duration or some variant thereof as the MOU for the call. Alternatively, if the CDR includes just start and stop times, the usage subsystem 40 might compute a call duration as the difference between the start and stop times and then use that call duration or some variant thereof as the MOU for the call. Further, the usage subsystem 40 may refer to subscriber profile records (which might be stored in account store 48 or elsewhere) to determine if special MOU calculations should be made for particular subscribers. Still further, the usage subsystem 40 might perform different MOU calculations depending on time, day or date or still other factors.

As a specific example, the usage subsystem 40 could simply read or compute an actual call duration (including minutes and seconds) from a CDR (i.e., extract a call duration from the CDR) and treat that call duration as the MOU. As another example, the usage subsystem 40 could determine a call duration from the CDR, round that duration up to the nearest whole minute, and treat the rounded number of minutes as the MOU for the call. (Note that rounding call duration up to the nearest whole minute effectively treats any partial minute at the end of the call as a whole minute.) And as yet another example, the usage subsystem 40 could apply special MOU-calculation rules for particular types of calls or particular subscribers, such as (i) concluding that any call between two subscribers in the carrier's network (e.g., mobile-to-mobile calls) had zero MOU, (ii) concluding that any call to the carrier's customer service center or to other special destinations had zero MOU, or (ii) adjusting the MOU for a given call due to a service level of the caller, or for promotional purposes or other reasons. Other examples are possible as well.

As the usage subsystem 40 records the MOU for a given call into the appropriate record in account store 48, the usage subsystem 40 may update a total number of minutes used for that account during the current billing period (e.g., month, quarter, etc.) Alternatively, the usage subsystem 40 may simply record in the subscriber account an indication of MOU together with a description of the call (e.g., called number, time of call, etc.)

At the end of the billing period for the subscriber or at another designated time, the pricing subsystem 42 will next apply a banded-billing process so as to determine a charge for the minutes that the subscriber used during the billing period. Note that, for a given subscriber account, the pricing subsystem 42 could perform this function separately for different categories of calls, such as for wireless, landline, long distance calls, voice, data, or other sorts of calls, and the pricing subsystem 42 could produce separate charges for each category of calls. Alternatively, the pricing subsystem 42 could perform this function cumulatively for all types of calls, thus producing a cumulative charge to the subscriber.

In order to carry out the banded-billing process, the billing system will preferably maintain in data storage a banded-pricing schedule 50, which specifies minute-ranges and respective costs. More particularly, the banded-pricing schedule 50 will preferably take the form of a stored table that divides a continuum of minutes of use into a series of contiguous, mutually-exclusive minute-ranges and that specifies for each minute-range a respective cost.

Preferably, the continuum of minutes of use will start at a low end of zero minutes and extend to a designated high end, such as 1,250 minutes for instance. Further, each of a plurality of the minute-ranges listed in the table (e.g., every minute-range) will preferably span multiple minutes, such as 25, 50 or 100 minutes for instance. Yet further, the various minute-ranges in the table can be the same size as each other or can vary in size from each other.

FIGS. 2 and 3 illustrate some example banded-pricing schedules, although it should be understood that other examples are possible as well. Each table is structured with three columns and multiple rows, with each row identifying a particular minute-range and specifying a respective monthly cost for the minute-range. More particularly, for each minute-range, the first and second columns set forth the upper and lower limits of the minute-range and the third column sets forth the cost for use that falls within those limits.

The banded-pricing schedule of FIG. 2 begins with a lowest range of 0 to 300 minutes, then continues with 25-minute ranges through 650 minutes, and then continues with 50-minute ranges through 1,250 minutes. For the first minute-range, the schedule assigns a cost of $35.00, and for each subsequent minute-range, the schedule increases the monthly cost by $2.50.

Algorithmically, this schedule is an example of one that has a first minute-range of 0 to P minutes, that then continues with N minute-ranges $R_k$ each extending from $\{P+(k-1)(Q)+1\}$ minutes to $\{P+(k)(Q)\}$ minutes, and that then continues with M minute-ranges $R_j$ each extending from $\{P+(N)(Q)+(j-1)(T)+1\}$ minutes to $\{P+(N)(Q)+(j)(T)\}$ minutes, where k=1, 2, 3, . . . , N, where j=1, 2, 3, . . . , M, where Q is a number of minutes, and where T is a number of minutes greater than Q. More particularly, in this schedule, P=300, Q=25, T=50, N=14, and M=12.

Further, the cost that this schedule sets forth for the first minute-range could be represented as a value C, with the cost for the next N subsequent minute-ranges $R_k$ being represented as a value $C+(k)(G)$, and with the cost for the following M minute ranges $R_j$ being represented as a value $C+(N)(G)+(j)(G)$, where G is an incremental cost. More particularly, in this schedule, C=$35.00 and G=$2.50.

The banded-pricing schedule of FIG. 3, on the other hand, begins with a lowest range of 0 to 300 minutes, then continues with 25-minute ranges through a high end of 950 minutes. For the first minute-range, the schedule assigns a cost of $35.00, for each minute-range through the 625:650 range, the schedule increases the monthly cost by $3.00, and for each subsequent minute-range, the schedule increases the monthly cost by just $1.50.

Algorithmically, this second schedule is an example of one that has a first minute-range of 0 to P minutes, that then continues with N minute-ranges $R_k$ each extending from $\{P+(k-1)(Q)+1\}$ minutes to $\{P+(k)(Q)\}$ minutes, and that then continues with M minute-ranges $R_j$ each extending from $\{P+(N)(Q)+(j-1)(Q)+1\}$ minutes to $\{P+(N)(Q)+(j)(Q)\}$ minutes, where k=1, 2, 3, . . . , N, where j=1, 2, 3, . . . , M, and where Q is a number of minutes. More particularly, in this schedule, P=300, Q=25, N=14, and M=12.

Further, the cost that the schedule of FIG. 3 sets forth for the first minute-range could be represented as a value C, with the cost for the next N subsequent minute-ranges $R_k$ being represented as a value $C+(k)(G)$, and with the cost for the following M minute ranges $R_j$ being represented as a value $C+(N)(H)+(j)(H)$, where G is an incremental cost, and where H is an incremental cost less than G. More particularly, in this schedule, C=$35.00, G=$3.00, and H=$1.50 (i.e., H is half of G).

Although the examples shown in FIGS. 2 and 3 provide for variation in the incremental cost increase per minute-range after a certain number of minute-ranges or variation in the size of minute-ranges after a certain number of minute-ranges, it is possible that all of the minute-ranges could be the same size and/or that all of the minute-ranges could provide for the same incremental cost increase.

Further, other variations in the structure of the banded-pricing schedule are possible as well. For instance, after a first number of minute-ranges, the size of the minute-ranges might decrease, and after a second number of minute-ranges, the size of the minute-ranges might decrease further. As another example, after a first number of minute-ranges, the incremental cost increase per minute-range might decrease, and after a second number of minute-ranges, the incremental cost increase per minute-range might decrease further. And as yet another example, the lowest minute-range could span the same number of minutes as each of the other minute ranges.

As shown in FIG. 1, the banded-pricing schedule can be stored in a database external to the pricing subsystem 42, such as in a file server that is part of the billing system 24. Alternatively, the banded-pricing schedule could be stored in data storage (e.g., ROM or hard disk storage) of the pricing subsystem 42. Further, backup copies could be provided for redundancy.

To apply the banded-billing process, the pricing subsystem 42 will determine how many minutes of telecommunication service a given subscriber used in a billing period (such as a monthly or quarterly) and will then query the banded-pricing schedule 50 to determine (i) which minute-range the number of minutes falls into and (ii) the specified cost for that minute-range. The pricing subsystem 42 will then record that cost as a charge in the subscriber's account record.

The pricing subsystem 42 can be arranged to determine the number of minutes used by the subscriber in the billing period in various ways. For instance, if the usage subsystem 40 has already provided a total number of minutes of use in the subscriber account record, then the pricing subsystem 42 can determine the number of minutes by reading that total from the account record. As another example, the pricing subsystem 42 can itself total up the subscriber's minutes of use for the billing period, based on the MOU calculations that the usage subsystem 40 recorded in the account record. The pricing subsystem 42 can further apply special rules in determining how many minutes of use the subscriber used in the period. For instance, the pricing subsystem 42 could disregard minutes of use for particular types of calls (e.g., customer service calls or mobile-to-mobile calls) or for other reasons, or the pricing subsystem 42 could provide various promotional discounts or other adjustments.

The total number of minutes that the pricing subsystem 42 (or other aspects of billing system 24 or network 10) determines a subscriber used in a given billing period does not need to be an exact representation of the quantity of service actually used by the subscriber in that period, although it is preferably a very close approximation. For instance, as noted above, the determination could involve rounding of call durations or making other adjustments of the number of minutes. The end result, in any event, is a determination of number of minutes used.

Once the pricing subsystem 42 has determined the number of minutes of use for the given subscriber during the billing period, the pricing subsystem 42 then queries the banded-pricing schedule 50 to determine which minute-range the number of minutes falls into and to determine the price that the schedule specifies for that minute-range.

By way of example, referring to the banded-pricing schedule of FIG. 2, if the subscriber used 662 minutes in the billing period, then the pricing subsystem 42 will determine that the subscriber's use falls into the minute-range of 651:700 and that the specified cost for that minute-range is $72.50. Alternatively, if the subscriber used 1,045 minutes the billing period, then the pricing subsystem 42 will determine that the use falls into the minute-range of 1001:1050 and that the specified cost for that minute-range is $90.00. Still alternatively, if the subscriber used 390 minutes in the billing period, then the pricing subsystem 42 will determine that the use falls into the minute-range of 376:400 and that the specified cost for that minute-range is $45.00.

The pricing subsystem 42 will then store in the subscriber's account record an indication of the determined cost for billing period. Further, the pricing subsystem 42 may record other charges to the subscriber's account, such as taxes, fees and surcharges that might be prescribed by law, and may apply various discounts to the determined cost.

In turn, the billing subsystem 44 may then produce an invoice to send to the subscriber for the billing period. For instance, the billing subsystem 44 may produce an invoice that lists MOU per call during the billing period, a total number of minutes determined to have been used during the billing period, a determined cost for that use, and any adjustments to the total. The billing subsystem 44 may then send the invoice to the subscriber, by postal mail, e-mail or in some other manner.

Figure 4:
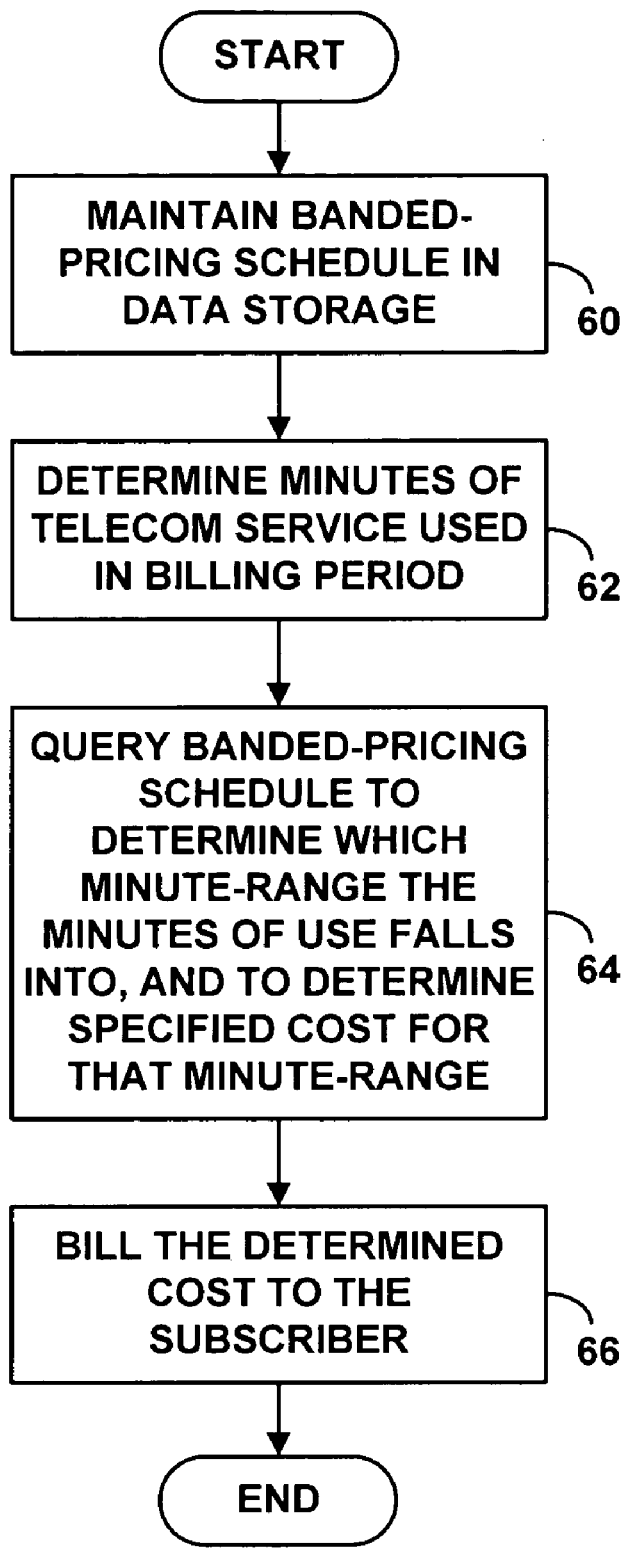
FIG. 4 is a flow chart depicting functions that can be carried out in accordance with an embodiment of the invention.

FIG. 4 is a flow chart summarizing functions of the banded-billing system as described above. As shown in FIG. 4, at block 60, the billing system 24 maintains in data storage a banded-pricing schedule that divides a continuum of minutes into a series of contiguous, mutually-exclusive minute-ranges and that specifies for each minute-range a respective cost. At block 62, the billing system 24 determines a number of minutes of telecommunication service used by a given subscriber during a given period. At block 64, the billing system 24 the queries the banded-pricing schedule to determine which minute-range the number of minutes falls into, and to determine the cost specified by the banded-pricing schedule for that minute-range. In turn, at block 66, the billing system 24 bills the determined cost to the given subscriber, for use of the telecommunication service during the given period. (This billing function could comprise recording the determined cost (or some variant thereof) in the subscriber's account record, and it could further comprise sending an invoice to the subscriber to request payment.)

Finally, although the foregoing discussion assumes that a subscriber's use will be measured in increments of minutes, it should be understood that the extent of use could be measured in other time increments as well. For instance, subscriber use could be measured in (i) seconds or other fractions of minutes, (ii) groups of minutes, (iii) hours, or (iv) some other time increment.

Thus, considering "increments" in place of "minutes" in the discussion above, billing system 24 could (a) maintain a banded-pricing schedule that divides a continuum of increments of use into a series of contiguous, mutually-exclusive increment-ranges and that specifies for each increment-range a respective cost, (b) determines a number of increments of use of telecommunication service by a given subscriber during a given period, (c) queries the banded-pricing schedule to determine which increment-range the number of increments falls into, and to determine the cost specified by the banded-pricing schedule for that increment-range, and (d) bills the determined cost to the given subscriber, for use of the telecommunication service during the given period.

An exemplary embodiment of the present invention has been described above. Those skilled in the art will understand, however, that changes and modifications may be made to the embodiment described without departing from the true scope and spirit of the invention, which is defined by the claims.

What is claimed is:

1. A banded billing method for telecommunication services comprising:
   maintaining in data storage a banded-pricing schedule that divides a continuum of minutes of use into a series of contiguous, mutually-exclusive minute-ranges and that specifies for each minute-range a respective cost;
   determining a number of minutes of telecommunication service that were used by a given subscriber during a given period;
   querying the banded-pricing schedule to determine which minute-range the number of minutes falls into, and to determine the cost specified by the banded-pricing schedule for that minute-range; and
   billing the determined cost to the given subscriber, for use of the telecommunication service during the given period,
   wherein the series of minute-ranges begins with a first minute-range of 0 to P minutes, and then continues with minute-ranges $R_k$, each extending from $\{P+(k-1)(Q)+1\}$ minutes to $\{P+(k)(Q)\}$ minutes, wherein k=1, 2, 3, ..., N, and wherein Q is a number of minutes.

2. The banded billing method of claim 1, wherein P=300, and wherein Q=25.

3. The banded billing method of claim 2, wherein N=14.

4. The banded billing method of claim 1, wherein:
   the cost that the banded-pricing schedule specifies for the first minute-range is C, and the cost that the banded-pricing schedule specifies for each subsequent minute-range $R_k$ is C+(k)(G), wherein G is an incremental cost.

5. The banded billing method of claim 4, wherein G=$2.50.

6. The banded billing method of claim 1, wherein, after N minute-ranges following the first minute-range, the series of minute-ranges continues with minute-ranges $R_j$, each extending from $\{P+(N)(Q)+(j-1)(T)+1\}$ minutes to $\{P+(N)(Q)+(j)(T)\}$ minutes, wherein j=1, 2, 3, ..., M, and wherein T is a number of minutes greater than Q.

7. The banded billing method of claim 6, wherein T=50.

8. The banded billing method of claim 6, wherein:
   the cost that the banded-pricing schedule specifies for the first minute-range is C,
   the cost that the banded-pricing schedule specifies for each subsequent minute-range $R_k$ is C+(k)(G), wherein G is an incremental cost, and
   the cost that the banded-pricing schedule specifies for each subsequent minute-range $R_j$ is C+(N)(G)+(j)(G).

9. The banded billing method of claim 1, wherein, after N minute-ranges following the first minute-range, the series of minute-ranges continues with minute-ranges $R_j$, each extending from $\{P+(N)(Q)+(j-1)(Q)+1\}$ minutes to $\{P+(N)(Q)+(j)(Q)\}$ minutes, wherein j=1, 2, 3, ..., M, and wherein:
   the cost that the banded-pricing schedule specifies for the first minute-range is C, the cost that the banded-pricing schedule specifies for each subsequent minute-range $R_k$ is $C+(k)(G)$, wherein G is an incremental cost, and the cost that the banded-pricing schedule specifies for each subsequent minute-range $R_j$ is $C+(N)(H)+(j)(H)$, wherein H is an incremental cost less than G.

10. The banded billing method of claim 9, wherein H is half of G.

11. The banded billing method of claim 1, wherein the telecommunication service comprises wireless telecommunication service.

12. The banded billing method of claim 1, wherein the telecommunication service comprises voice telecommunication service.

13. The banded billing method of claim 1, wherein the telecommunication service comprises data telecommunication service.

14. The banded billing method of claim 1, wherein determining the number of minutes of telecommunication service that were used by the given subscriber in the given period comprises extracting usage data from call detail records generated by one or more telecommunication switches.

15. The banded billing method of claim 1, wherein the given period is a month.

16. The banded billing method of claim 1, further comprising:

treating as a minute of use any partial minute used at a conclusion of a communication session.

17. The banded billing method of claim 1, wherein billing the determined cost to the subscriber comprises recording the cost in a subscriber account record.

18. The banded billing method of claim 1, wherein billing the determined cost to the given subscriber comprises generating and sending to the given subscriber an invoice indicating the determined cost.

* * * * *